United States Patent
Kharisov

(10) Patent No.: US 8,976,483 B1
(45) Date of Patent: Mar. 10, 2015

(54) ROTATIONAL VIBRATION COMPENSATION USING MICROACTUATOR

(71) Applicant: The Board of Trustees of the University of Illinois, Urbana, IL (US)

(72) Inventor: Evgeny Kharisov, Chaska, MN (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 14/176,768

(22) Filed: Feb. 10, 2014

(51) Int. Cl.
*G11B 5/596* (2006.01)
*G11B 21/02* (2006.01)

(52) U.S. Cl.
USPC ..... 360/78.05; 360/75; 360/78.12; 360/78.09

(58) Field of Classification Search
None
See application file for complete search history.

(56) References Cited

U.S. PATENT DOCUMENTS

| | | | |
|---|---|---|---|
| 6,122,139 A | 9/2000 | Sri-Jayantha et al. | |
| 6,493,177 B1 | 12/2002 | Ell et al. | |
| 6,741,417 B2 | 5/2004 | Hsin et al. | |
| 6,833,974 B2 | 12/2004 | Koso et al. | |
| 6,963,463 B2 | 11/2005 | Sri-Jayantha et al. | |
| 7,548,396 B2 | 6/2009 | Higashino | |
| 2001/0036034 A1* | 11/2001 | Chang et al. | 360/78.05 |
| 2002/0012193 A1* | 1/2002 | Kobayashi et al. | 360/78.05 |
| 2003/0030937 A1* | 2/2003 | Kohso et al. | 360/78.05 |
| 2013/0194697 A1 | 8/2013 | Hironaka | |

* cited by examiner

*Primary Examiner* — Andrew L Sniezek

(57) ABSTRACT

An apparatus includes a feedback controller receiving feedback from a position error signal of a hard drive read/write head. The feedback controller provides respective voice coil motor and microactuator control signals to a voice coil and microactuator that together position the hard drive read/write head in response to a position control signal. A rotational vibration feed-forward compensator receives vibration measurements via a sensor and providing a rotational vibration compensation signal in response thereto. A dynamic control allocator is coupled to the feedback controller and the rotational vibration feed-forward compensator. The dynamic control allocator is configured to combine a high frequency component of the rotational vibration compensation signal with the microactuator control signal; and to combine a low frequency component of the rotational vibration compensation signal with the voice coil motor control signal.

8 Claims, 12 Drawing Sheets

ROTATIONAL VIBRATION COMPENSATION USING MICROACTUATOR

BACKGROUND

Some hard drives are designed with the assumption that significant movement of the drive may occur while the hard drive is operating. As such, hard drives may include measures to compensate for shock and vibration that may occur during operation. For example, in a multi-drive configuration such as a disk array, the cooling fans as well as the drives themselves may generate vibrations that may be transmitted between hard drives through the structure in which they are mounted.

One type of vibration seen in drives is known as rotational vibration (RV), which is a twisting/torqueing type action. Rotational vibration is measured as an angular rate of change, e.g., radians per second. If RV is not taken into account in the design of the drive, the force of RV can push the head off track causing missed revolutions and delays in data transfers. Tests on drives not capable of handling RV have shown significant reductions in performance in the presence of RV.

SUMMARY

Various embodiments described herein are generally directed to methods, systems, and apparatuses that facilitate rotational vibration compensation using a microactuator. In one embodiment, an apparatus includes a feedback controller receiving feedback from a position error signal of a hard drive read/write head. The feedback controller provides respective voice coil motor and microactuator control signals to a voice coil and microactuator that together position the hard drive read/write head in response to a position control signal. A rotational vibration feed-forward compensator receives vibration measurements via a sensor and providing a rotational vibration compensation signal in response thereto. A dynamic control allocator is coupled to the feedback controller and the rotational vibration feed-forward compensator. The dynamic control allocator is configured to combine a high frequency component of the rotational vibration compensation signal with the microactuator control signal; and to combine a low frequency component of the rotational vibration compensation signal with the voice coil motor control signal.

In another embodiment, a method involves forming respective voice coil motor and microactuator control signals responsive to at least a position error signal of a hard drive read/write head. A rotational vibration compensation signal is provided in response to vibration sensor measurements. High and low frequency components of the rotational vibration compensation signal are formed based on a separation frequency. The high frequency component is combined with the microactuator control signal, and the low frequency component is combined with the voice coil motor control signal. The separation frequency is adjusted based on a response of the microactuator to at least the high frequency component.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates generally to techniques for compensating for RV. One technique for dealing with RV is known as RV feed-forward (RVFF) compensation. An RVFF compensator generally operates by measuring RV (e.g., via an accelerometer or piezoelectric sensor) and using the measurement to form a feed-forward signal. The feed-forward signal is applied to a voice coil motor (VCM) actuator that positions the read write head(s) over the disk tracks. This provides for more accurate seeking and tracking operations than if RVFF were not used.

The theoretical performance of the RVFF compensator is limited by the available bandwidth of the VCM actuator, where the available bandwidth of the system is defined as a frequency range for which the magnitude of the uncertainty/noise level is smaller than the gain of the frequency response of the system. As the performance requirements become stricter, the effect of high-frequency vibrations becomes more pronounced. Limited available bandwidth of the VCM actuator leads to high-gain demand from the RV compensator, which may affect robustness, noise amplification, and stability. Various embodiments described below utilize a microactuator together with a VCM to compensate for RV. In the embodiments described below, the microactuator is described as a piezoelectric actuator, e.g., PZT, although other microactuators may be used instead of PZT, such as micro-electro mechanical systems (MEMS), etc. Thus, while the term "PZT" may be commonly associated with a particular material used in a piezoelectric microactuator (lead zirconium titanate), the term "PZT" is used herein to refer to any type of microactuator, including piezoelectric microactuators made with a material other than lead zirconium titanate.

While the gain frequency response of the VCM rapidly decays with frequency (since it contains a double integrator), the gain plot of the PZT can stay relatively flat for most part of the frequency range of interest. Therefore using a PZT actuator along with VCM may result in an increase in the available actuator bandwidth and relieve the RVFF compensator from high-gain demands. In one example, a system utilizing a dual RV compensation path splits an RVFF control signal into two components, e.g., using a low-pass/high-pass filter combination based on a desired available bandwidth of the system. In such a case, the low-frequency component of the control signal is directed to the VCM actuator, and the high-frequency content is passed to the PZT microactuator, avoiding undesired attenuation by VCM. There may be overlap between the high- and low-frequency components, and the gain, phase, etc., of the high- and low-frequency components may be adjusted accordingly.

Figure 1:
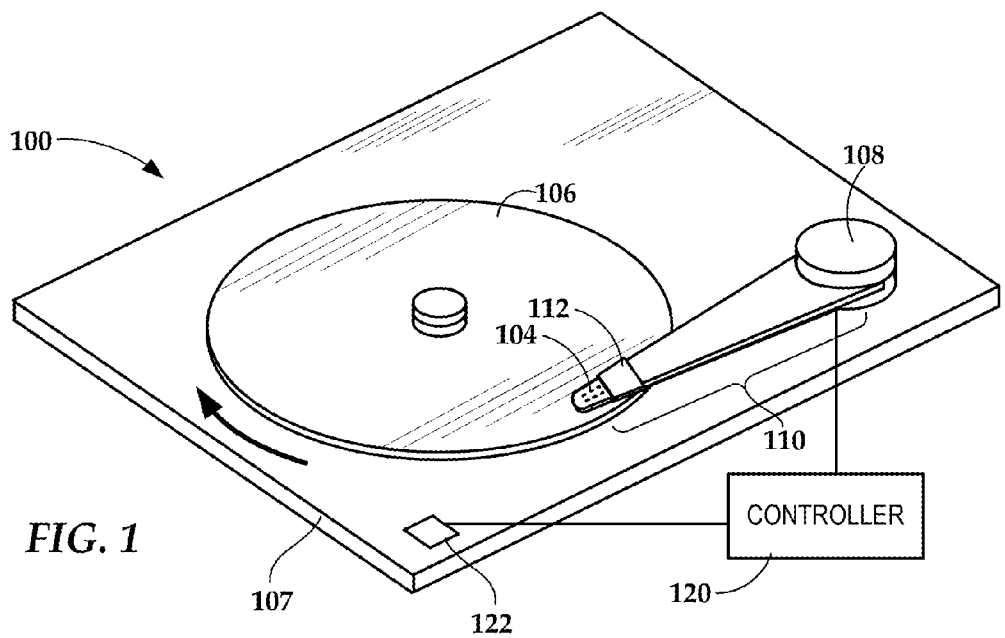
FIG. 1 is a perspective view of an apparatus according to an example embodiment.

In reference now to FIG. 1, a perspective view illustrates components of an apparatus 100 according to an example embodiment. The apparatus 100 may include components of a hard disk drive (HDD). The apparatus 100 utilizes a dual-stage actuating system to position a slider 104 over a spinning magnetic media 106 (e.g., a hard disk). An electric motor (not shown) mounted on a basedeck 107 drives the media 106 to achieve the desired media velocity. The slider 104 may include a read/write head that records to and reads from the media 106. The dual-stage actuating system includes a VCM 108 that drives an arm 110 with the slider 104 mounted at the end. The dual-stage actuating system also includes a microactuator 112 mounted in the arm 110 for fine tracking control of the slider 104.

While only one arm 110 and slider 104 is shown, the apparatus 100 may include multiple such arms, one for each surface of each disk 106 employed in the apparatus 100. Each arm may contain a microactuator for individual fine tracking control, although all arms may be commonly driven by the VCM 108. A controller 120 is electrically coupled to the microactuator and VCM 108 to apply control signals thereto. The controller 120 may also read data back from the microactuator 112 and VCM 108, e.g., position signals, sensor data. The controller 120 includes at least one of a processor, memory, and specialized logic and analog circuitry.

One or several RV sensors 122 can be located on the base deck 107 and/or on any other HDD component. The RV sensor(s) 122 measure(s) RV, which is used by the controller 120 for RVFF compensation. The sensors 122 may also detect other vibrational components, e.g., linear vibration, and RV components may be extracted from a signal produced by the sensors 122.

The illustrated microactuator 112 is shown located within a suspension of the arm 110. In other configurations, the microactuator 112 may be positioned elsewhere, such as between the end of the arm 110 and the slider 104. Generally, the microactuator 112 may be located anywhere in the apparatus 100 where it can assist a primary control component such as the VCM 108. The functions of the microactuator 112 may include fine/fast tracking and seeking control, reduction of run-out and other functions that generally improve drive performance. While the illustrated dual-stage actuating system is shown as driving a pivoting arm 110, concepts described below may be applicable to other types of drive systems, e.g., linear tracking arms.

The proposed systems herein provide RVFF correction using both the VCM 108 and microactuator 112. The system design facilitates, among other things: increasing stability in RVFF compensation; improving performance of RVFF adaptive control methods in the presence of high-frequency vibration; and facilitating the design and implementation of the control system to achieve performance improvements on over a wider frequency range as compared to existing RVFF methods.

Figure 2:
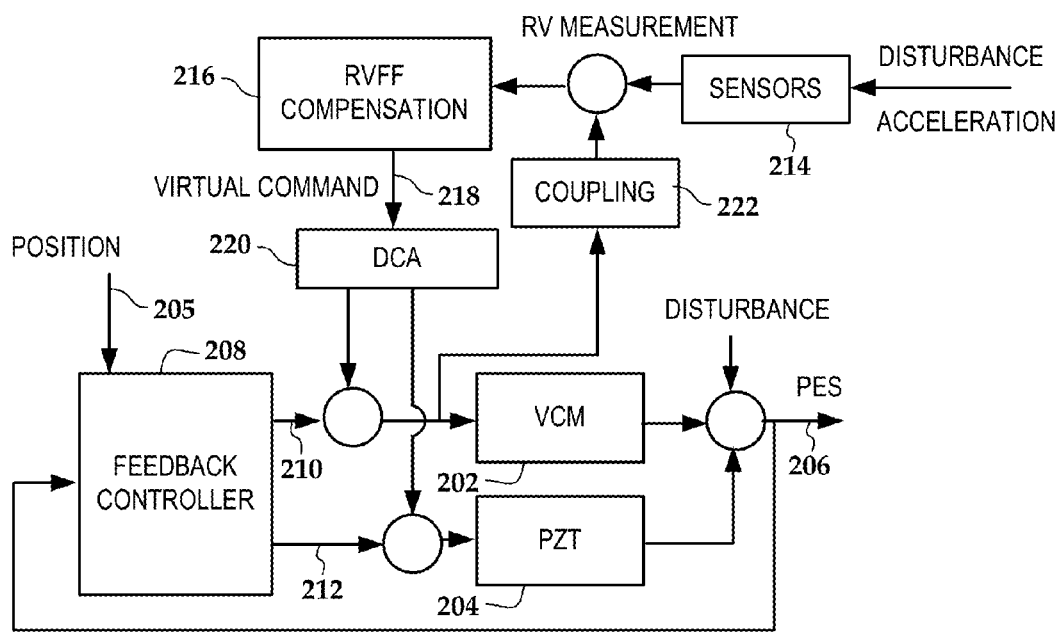
FIG. 2 a block diagram of a dual-stage control system according to an example embodiment.

In FIG. 2, a block diagram illustrates various components of a dual-stage controller system for a hard disk drive according to an example embodiment. The controller includes a VCM 202 and a PZT microactuator 204 that together control movement of a read/write head to achieve a commanded position 205 according to given performance specifications. The read/write head generates a position error signal (PES) 206 that indicates how far off the read/write head is from a desired position. The PES 206 is sent back to a feedback controller 208 that provides feedback signals 210, 212 to the VCM 202 and the PZT microactuator 204, respectively.

One or more sensors 214 are configured to at least detect RV affecting the hard disk drive. The output of the sensors 214 are sent to an RVFF compensation module 216, which produces an RV compensation signal 218. This signal 218 is annotated in the figure as a "virtual command," in that the signal 218 is targeted for a virtual actuator that includes both the VCM 202 and PZT 204. To provide separate commands to the VCM 202 and PZT 204, the virtual signal 218 is further processed by a dynamic control allocation (DCA) block 220 before being combined with feedback signals 210, 212.

Figure 3:
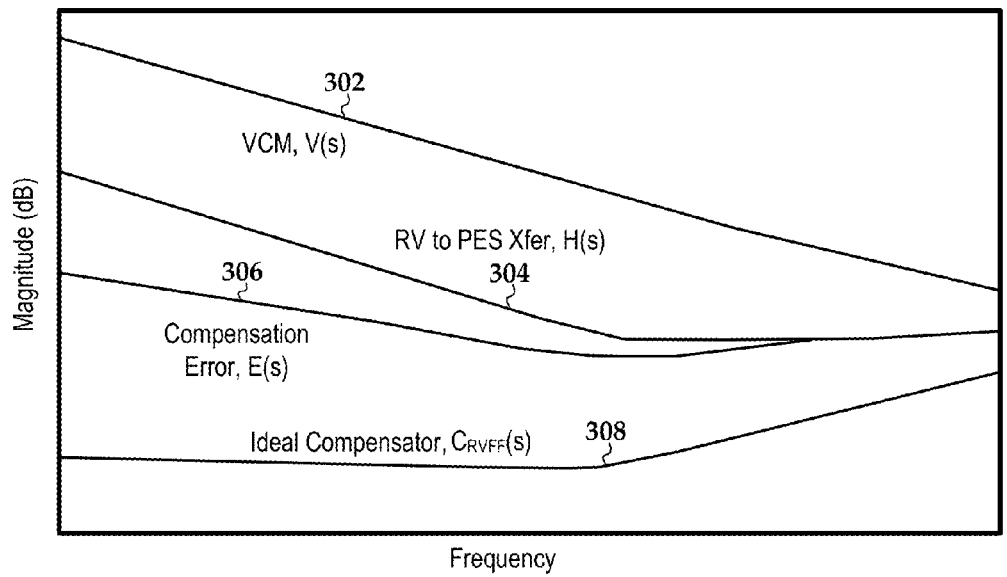
FIG. 3 is a gain plot of system transfer functions according to example embodiments.

To illustrate how the DCA block affects system performance, simplified gain plots of system transfer functions according to example embodiments are shown in FIG. 3. Curve 302 is the gain of the VCM model V(s). Curve 304 represents the typical shape of the gain response of an RV propagation path H(s), which is defined as a transfer function from RV measurement to the PES in the open loop. It should be noted that while it is technically difficult to directly measure H(s), it can be estimated using a two-stage identification process (not detailed here). If H(s) and V(s) are known and V(s) is invertible, then the theoretically ideal RVFF compensator will be given by $C_{RVFF}(s)=-H(s)/V(s)$. However, V(s) may be strictly proper and also it may have zeroes in the right half plane. In the latter case V(s) can be replaced by its invertible approximation $V_f(s)$, which, for example, may be computed using a Pade approximation of the non-minimum phase zeroes, such that $C_{RVFF}(s) \approx H(s)/V_f(s)$.

The gain plot of the theoretically ideal compensator $C_{RVFF}(s)$ computed for the example V(s) and H(s) is shown by curve 308 in FIG. 3. Also shown is PES compensation error 306, which is defined as $E(s)=H(s)-V(s)*C_{RVFF}(s)=H(s)-\{H(s)/V_f(s)\}*V(s)$. From FIG. 2 it can be seen that if the system is considered to have a disabled feedback controller 208 and assume that in such system PES is caused solely by RV (no other source of disturbance), the compensation error E will correspond to the residual PES remaining after RVFF compensation takes place. Notice that if $V_f(s)=V(s)$, then $E(s)=0$, which shows that the primary component of compensation error is the approximation of V(s) by $V_f(s)$. In this example, around the mid frequency range the compensation error gain becomes same as RV propagation path, which may limit effectiveness of VCM-only RVFF compensation above the defined frequency range.

While there are different approximate inversion techniques for non-minimum phase systems that can slightly improve efficiency, it may be difficult to eliminate these efficiencies by the controller design alone. It is also noted that the controller gain starts rising after some frequency point. This is explained by the fact that VCM gain has slope −40 dB/dec during most of the frequency range of interest, while RV propagation path may reduce its slope due to existing system modes.

Consequences of the $C_{RVFF}(s)$ controller gain raise shown in FIG. 3 may include reduction in system robustness and measurement noise amplification at higher frequencies. For example, the high-gain behavior of the compensator may lead to stability issues in the RVFF compensation. This is because the VCM control current creates an excitation signal, which is measured by RV sensors, and thus it creates the parasitic coupling loop affecting stability of the RVFF subsystem. This RVFF coupling loop is shown in FIG. 2 as coupling block 222 that connects between input to the VCM 202 and output of sensors 214.

Figure 4:
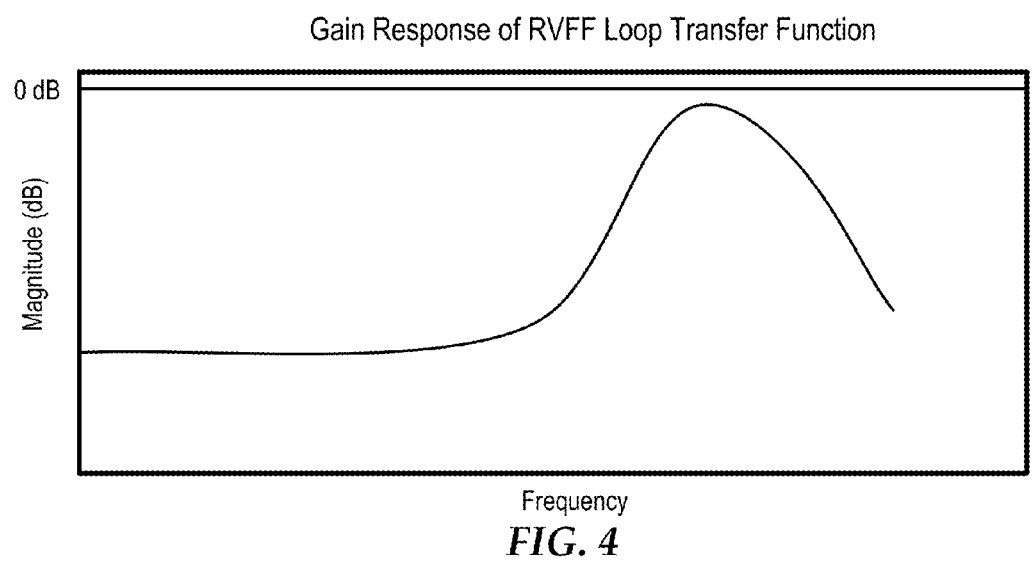
FIG. 4 is a gain plot of a rotational vibration, feed-forward, coupling loop transfer function of a hard drive according to an example embodiment.

The graph in FIG. 4 shows an estimate of the gain plot of the RVFF coupling loop transfer function (e.g., a transfer function from the VCM control signal to the RVFF compensator output) measured from a hard drive. Insufficient gain margin caused by the coupling gain approaching close to 0 dB in the high-frequency range may lead to stability issues of the RVFF subsystem. Reducing the high-frequency gain of the RVFF compensator improves the RVFF parasitic loop gain margins. However, a compensator using such a transfer function differs from the shape of $C_{RVFF}(s)$ in FIG. 3, resulting in reduced high-frequency performance as compared to a theoretically ideal compensator. As such, there is a tradeoff between system robustness (e.g., coupling loop stability margins) and system performance (e.g., closeness of the compensator to a theoretically ideal).

Figure 5:
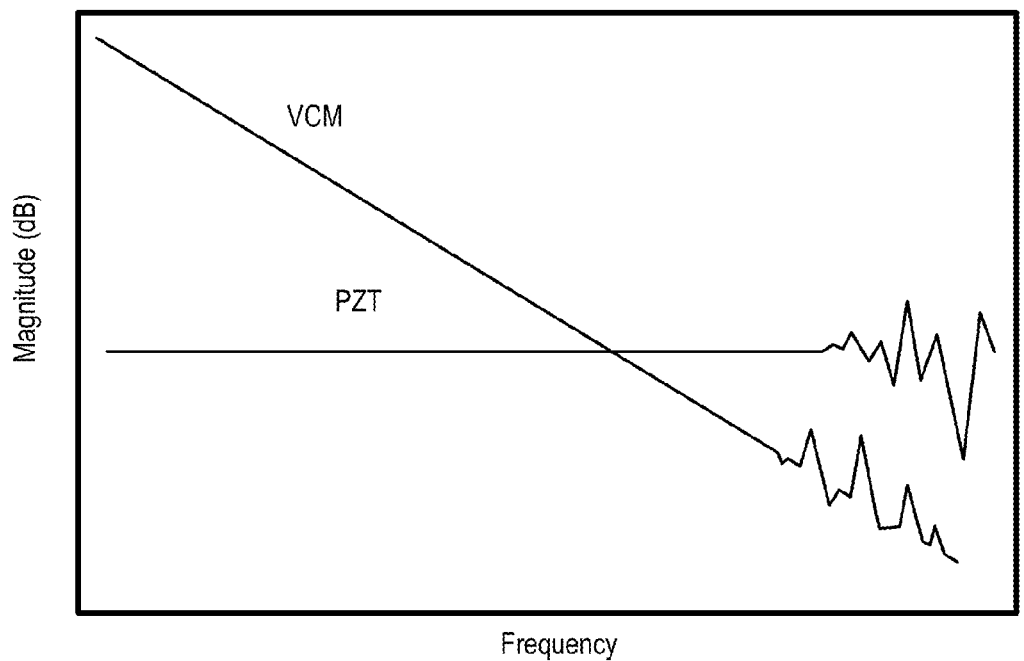
FIG. 5 is a graph showing gain response of a microactuator and a voice coil motor according to an example embodiment.

As shown in FIGS. 3 and 4, the VCM actuator and the parasitic coupling loop associated with it may limit theoretical performance. As such, including a PZT microactuator in the RVFF compensation pathway may be used to improve system performance in this regard. In FIG. 5, a graph shows gain responses of a PZT microactuator and VCM. It can be seen that the bandwidth of the microactuator covers a wider high-frequency range compared to the bandwidth of the VCM. Moreover, the PZT response exhibits no negative slope in the whole frequency range of interest. Therefore, the PZT microactuator can be used in combination with the VCM to create a virtual (combined) actuator with the structure compatible with the structure of the RV propagation path, which will avoid the high-gain control demand. In reference again to FIG. 2, this is achieved by using the DCA block 220, which is inserted after RVFF compensation 216.

The linear dynamic control allocation algorithm for the system shown in FIG. 2 is given by the relations $u_{VCM}(s)=F_{VCM}(s)v(s)$ and $u_{PZT}(s)=F_{PZT}(s)v(s)$, where $v(s)$ is the virtual control input 218, $u_{VCM}(s)$ and $u_{PZT}(s)$ are the commanded VCM and PZT control inputs, and $F_{VCM}(s)$ and $F_{PZT}(s)$ are the respective dynamic allocation filters. The PZT microactuator has limited stroke compared to the VCM, and this can be taken into account by appropriate selection of $F_{VCM}(s)$ and $F_{PZT}(s)$. Large magnitude disturbances generally reside in the low frequency range, while the high-frequency disturbances are relatively smaller. Therefore, selection of a control allocation frequency (e.g., separating frequency) that defines $F_{PZT}(s)$ helps ensure the PZT receives only signals within its available stroke, while the rest of the control command is directed to the VCM.

After implementation of the DCA algorithm, the virtual actuator for RVFF becomes $PES(s)=[VCM(s)F_{VCM}(s)+PZT(s)F_{PZT}(s)]*v(s)$. The choice of dynamic control allocation filters achieves the desired virtual actuator structure and bandwidth, which allows matching the virtual actuator response with RV propagation path H(s). Such an arrangement can avoid the issues associated with high-gain compensation. For concept validation, a simplified version of the DCA is used, with $F_{VCM}(z)=1$.

Figure 6:
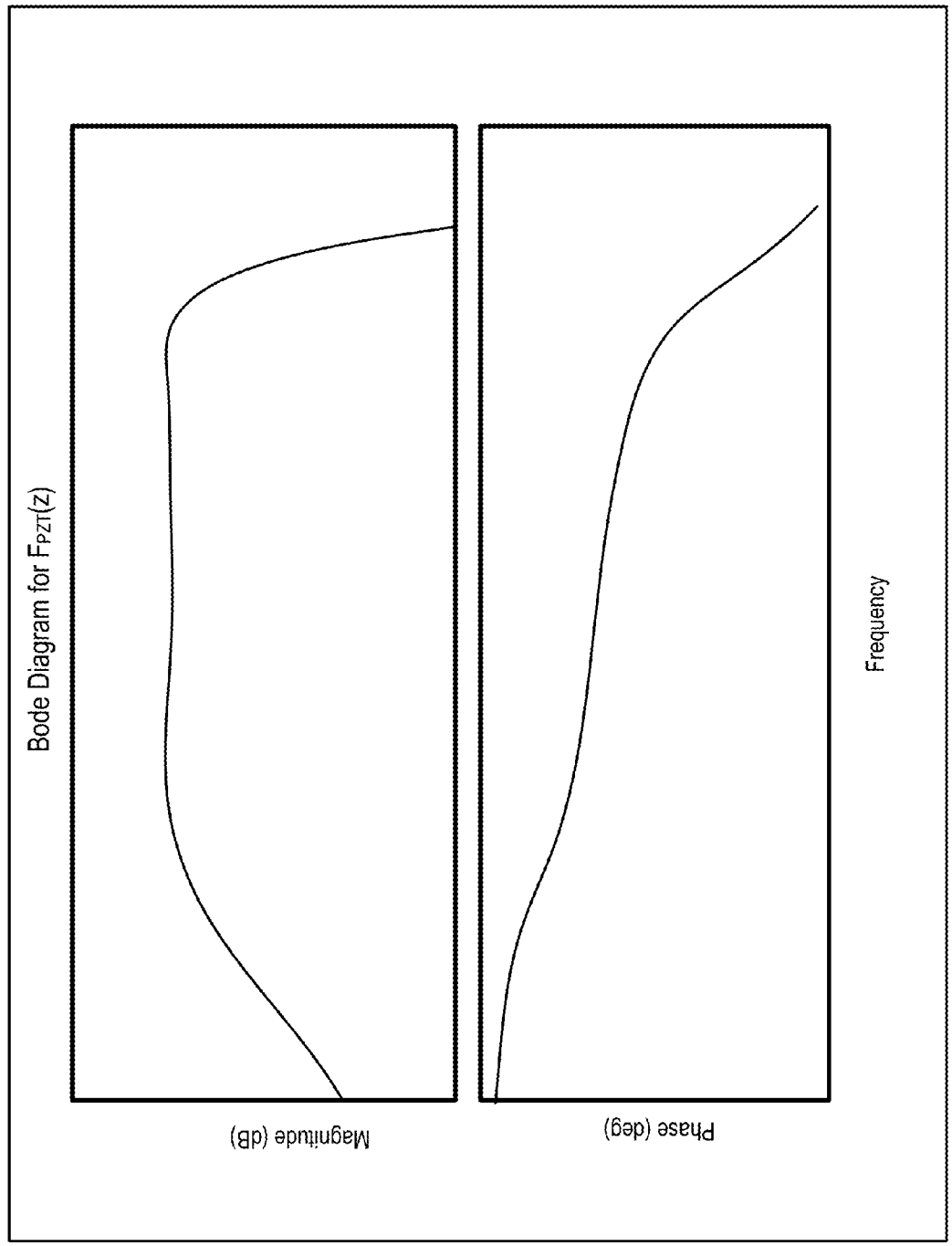
FIG. 6 is a Bode plot of a dynamic control allocation filter used for microactuator control signal according to an example embodiment.
Figure 7:
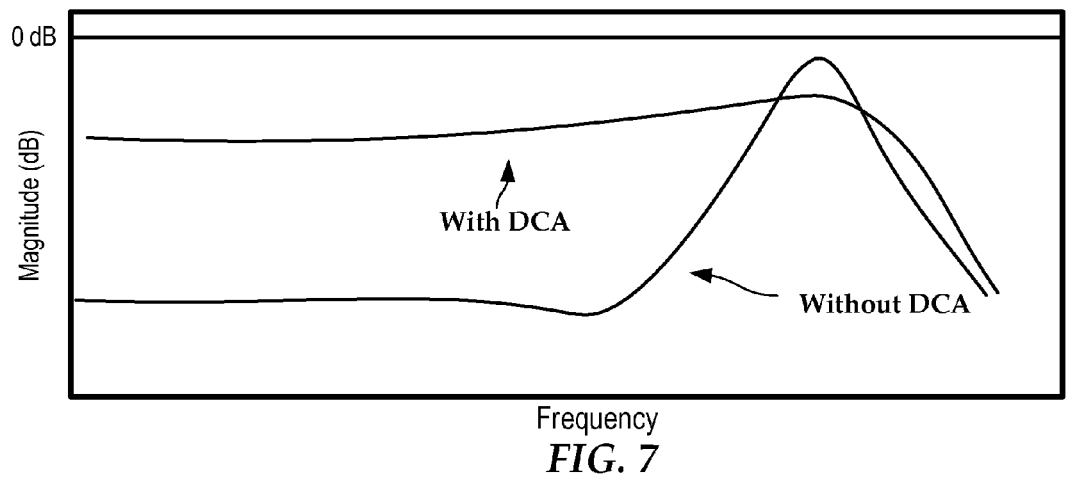
FIG. 7 is a gain plot of a rotational vibration, feed-forward, compensator coupling loop transfer function according to an example embodiment with and without dynamic control allocation activated.

The Bode plot for one choice of $F_{PZT}(z)$ is shown in FIG. 6. Since the actuator structure changes when the DCA is enabled, the RVFF compensator is adjusted accordingly. Recall that without DCA, approaching the ideal compensator shape closely may cause instability of the RVFF. The risk of instability requires reduced gain of the RVFF compensator, which results in a more conservative compensator with reduced performance. In the presence of DCA, the stability issue is removed and RVFF compensators as close as possible to theoretically ideal are used. In reference now to FIG. 9, a simplified gain plot shows a comparison of RVFF loop transfer functions with and without DCA. These graphs show improvement of gain margin of the RVFF with DCA on.

Figure 8:
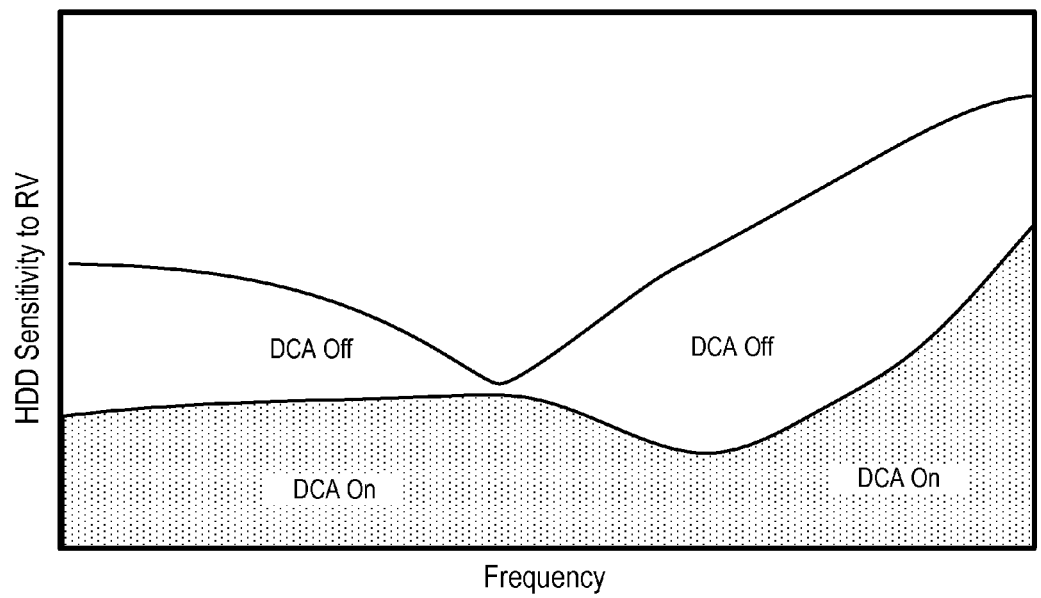
FIG. 8 is a graph showing rotational vibration sensitivity of a closed-loop system according to an example embodiment with and without dynamic control allocation activated.
Figure 9:
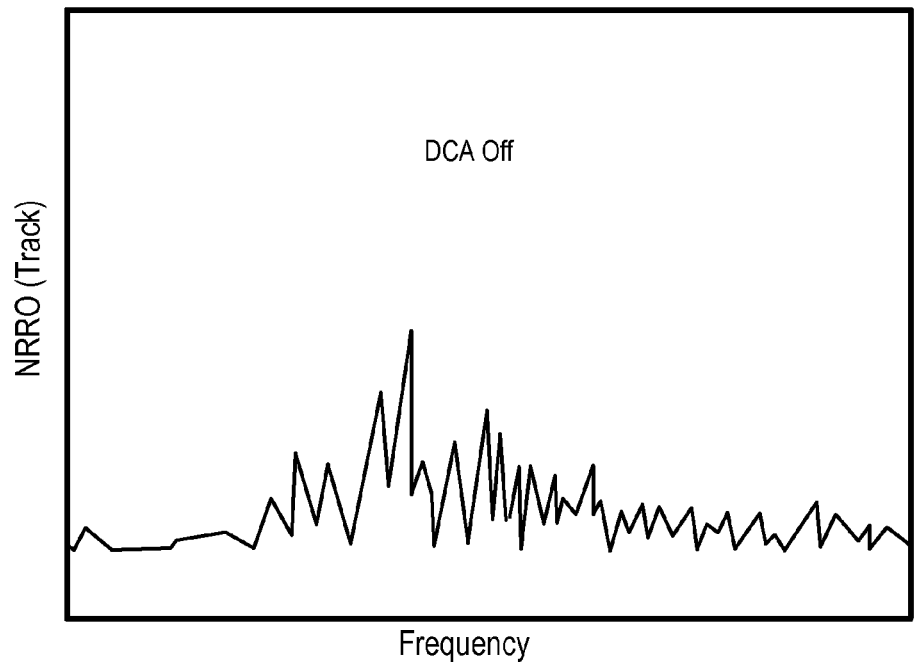
FIGS. 9 and 10 are graphs showing non-repeatable runout errors for an apparatus according to an example embodiment with and without dynamic control allocation activated.
Figure 10:
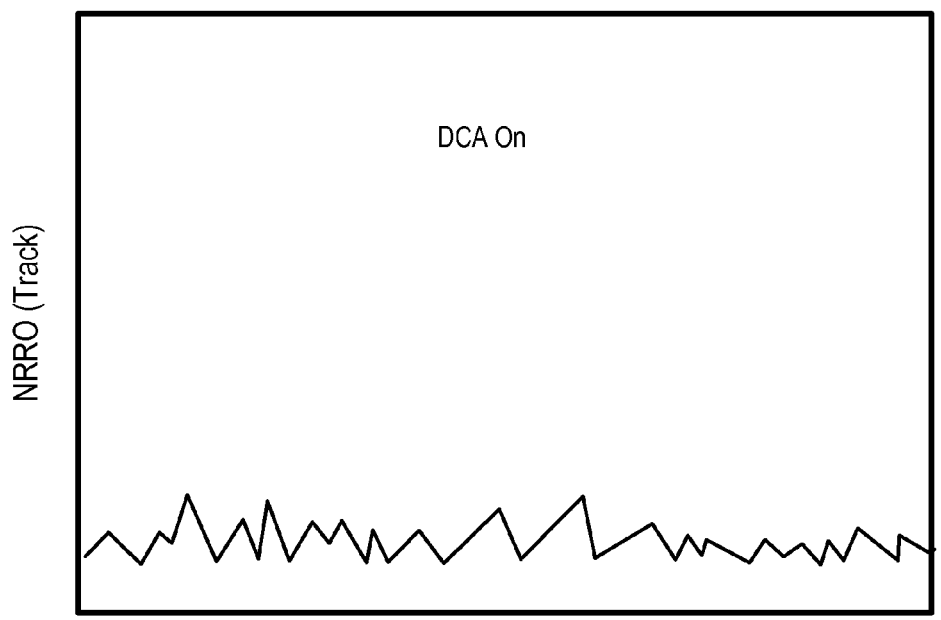

In FIG. 8, a graph shows RV sensitivity of a closed-loop system (RV acceleration to PES) for DCA off and on. Performance improvement can be also observed across the spectrum for the closed-loop system, particularly in the mid-to-high frequency range. In FIGS. 9 and 10, graphs show non-repeatable runout (NRRO) errors measured for DCA off and on, respectively. The NRRO was determined in the presence of a standard RV input profile. Comparing FIG. 9 with FIG. 10 shows about 30% NRRO reduction for enabled DCA algorithm in the presence of RV.

Figure 11:
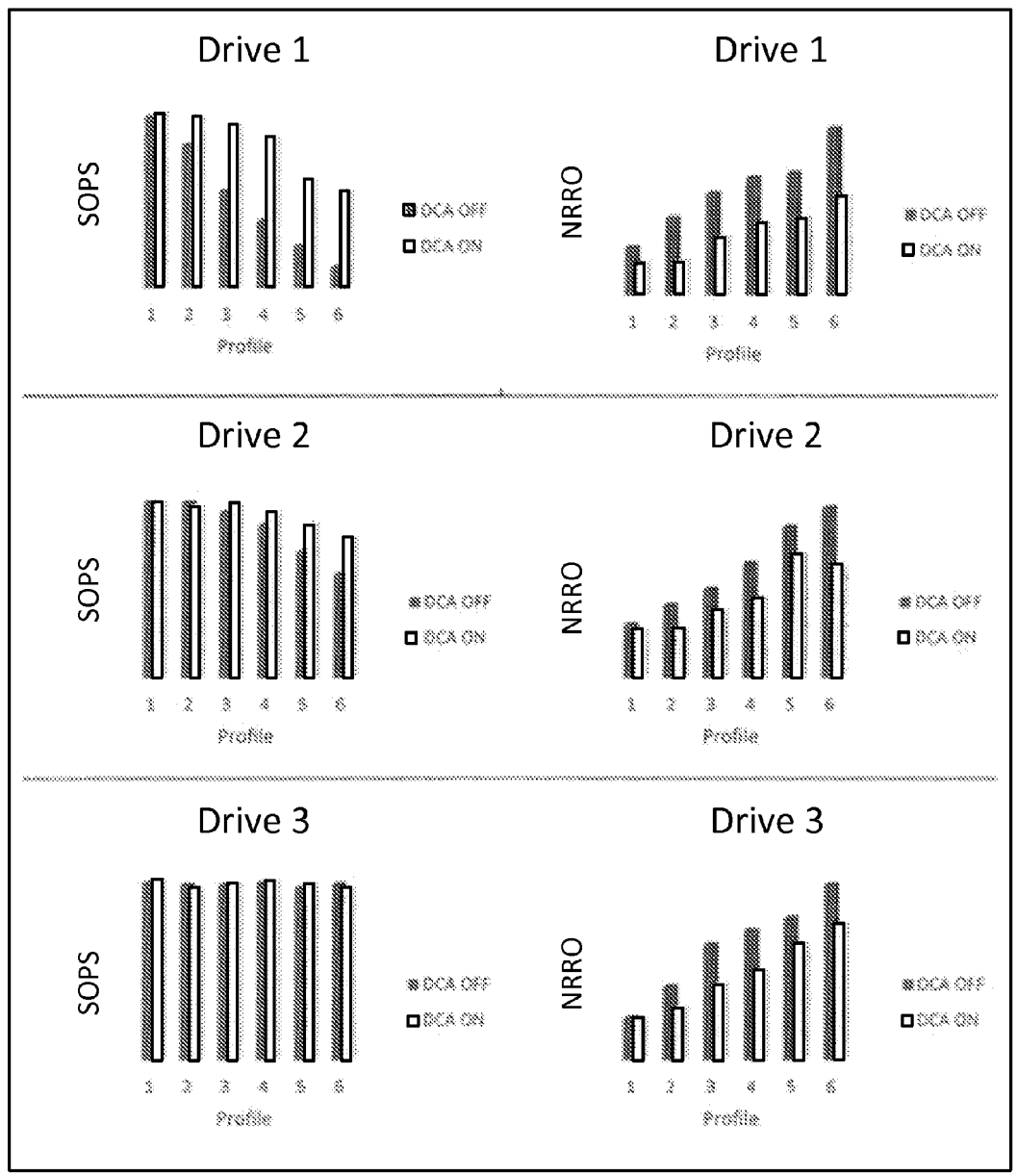
FIGS. 11 and 12 are bar graphs summarizing experiments performed with drives according to an example embodiment comparing performance with and without dynamic control allocation activated.
Figure 12:
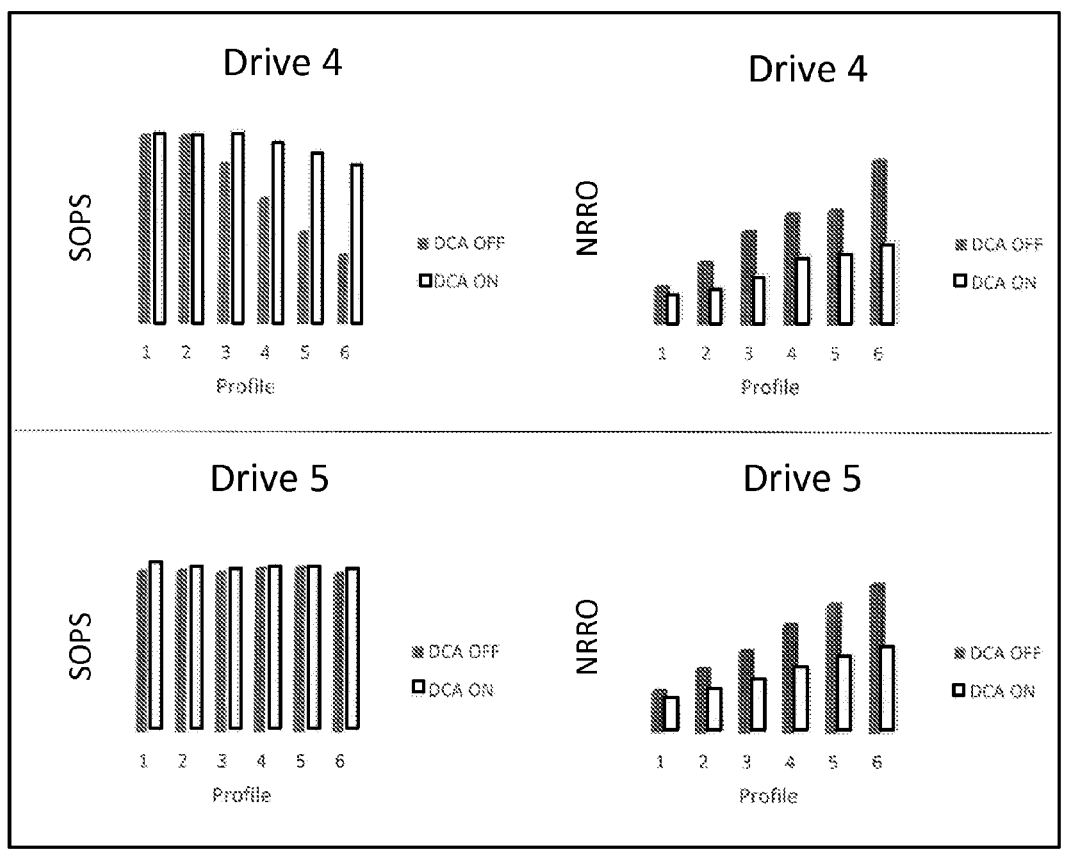

To check consistency of the observed improvement, similar experiments were performed with five drives. The results of the experiments are summarized in FIGS. 11 and 12. For all drives, a common RV profile was applied with vibration magnitudes increasing from level 1 to level 6. All drives had same adaptive RVFF compensation algorithm, which attempts to approximate the theoretical ideal compensator both for DCA and without. The same DCA with the filters described above were used for all the drives. Measurement were taken of seek operations per second (SOPS) and NRRO with DCA on and off. It can be seen that drive 1 and 4 without DCA experience stability issues resulting in reduced SOPS at higher vibration magnitudes. Enabling DCA helps to improve their performance. On the other hand drives 3 and 5 do not show noticeable SOPS degradation without DCA even for large vibration. In this case enabling DCA does not show any effect for these drives. These drives may have reduced coupling gain due to production variation, which allows the adaptive algorithm safely achieve response close enough to the ideal theoretical compensator even during seek operation.

Figure 13:
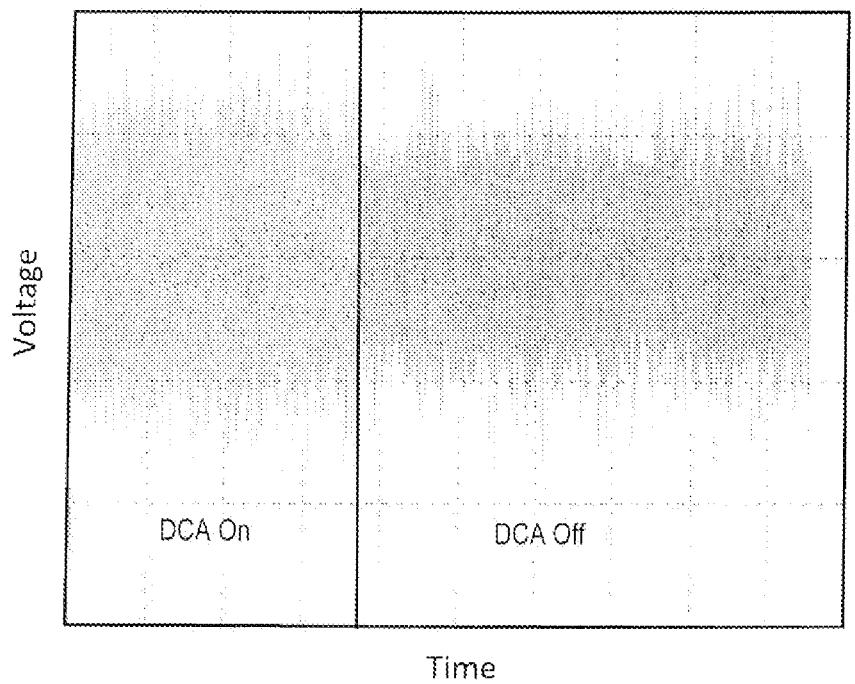
FIGS. 13 and 14 are graphs of microactuator voltage versus time for an apparatus according to an example embodiment comparing performance with and without dynamic control allocation activated.
Figure 14:
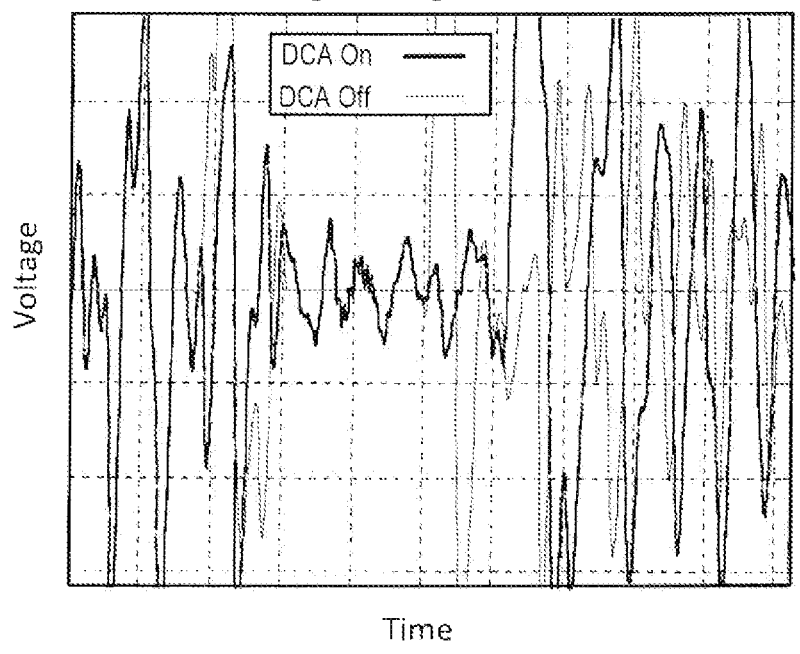

Next, from the NRRO diagrams, noticeable reduction of PES can be seen after enabling DCA for all of the drives under vibration. Finally, the time history of PZT voltage over 1000 seeks was measured and shown in FIGS. 13-14. The graph of FIG. 14 is a close of view of a portion of the signal in FIG. 13. As best seen in FIG. 13, the magnitude of the PZT voltage with DCA on is comparable to the magnitude with DCA off. Notice that when DCA is turned on, the PZT is receiving a compensation signal during seeks, which explains SOPS improvement for some of the drives in FIGS. 11-12. Also notice that the duration of the signal in FIG. 13 where DCA is on (left hand side) is shorter than the signal with DCA off (right hand side). This results from the 1000 seeks being completed faster when DCA is turned on.

Figure 15:
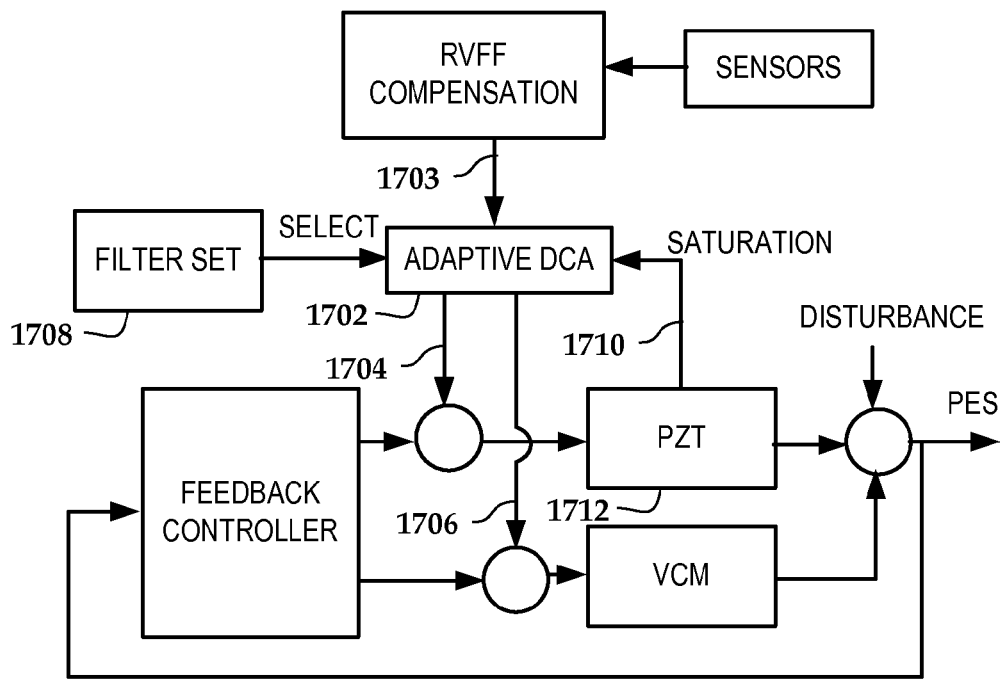
FIG. 15 is a block diagram illustrating an adaptive dynamic control allocation system according to an example embodiment.

In order to use the available PZT stroke more efficiently and simultaneously reduce PZT saturation hit events, an adaptive DCA filter tuning may be utilized. In FIG. 15, a block diagram illustrates an adaptive DCA system according to an example embodiment. Unless otherwise noted, the operation of the system of FIG. 15 may be understood by making reference to the description hereinabove of like-named components shown in FIG. 2.

An adaptive DCA module 1702 separates an RVFF compensation signal 1703 to a PZT correction signal 1704 and a VCM correction signal 1706. The adaptive DCA module 1702 may include a learning block that determines during operation how much PZT stroke is being used. In response, the adaptive DCA module 1702 adjusts bandwidth of $F_{PZT}(s)$ to optimize the PZT usage. In this way, the adaptive DCA module 1702 can adapt to variables such as manufacturing variability, device aging, different conditions of use, disturbance, etc.

A set 1708 of filters are defined and/or generated for use in defining a frequency (or range thereof) that defines a separation between the PZT correction signal 1704 and the VCM correction signal 1706. For example, a default filter may be selected from the set 1708 during system initialization. The default filter may minimize magnitude of the PZT correction signal 1704. Thereafter, microactuator saturation event 1710 is detected at the PZT 1712. A different filter may be selected from the set 1708 to increase the PZT correction signal 1704, and saturation 1710 is again detected. This may be repeated until the saturation occurrence 1710 is at a desired rate (e.g., number of events during a given time interval), e.g., so that PZT stroke is maximized without being significantly saturated. The adaptive process may use a different start filter, e.g., one that maximizes PZT correction signal 1704 or somewhere in between. The subsequent adaptation can be adjusted accordingly.

Figure 16:
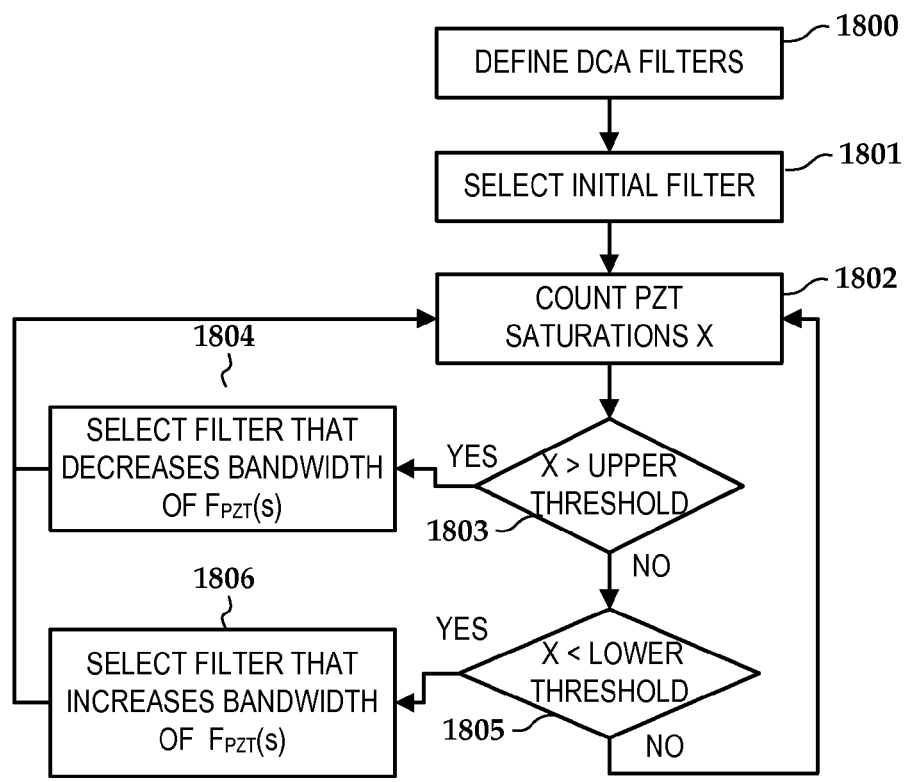
FIG. 16 is a flowchart of a method according to an example embodiment.

An example method of performing adaptive DCA according to an example embodiment is shown in the flowchart of FIG. 16. The method involves defining 1800 a set of DCA filters. The set may be a predefined, finite, set having an enumerated set of filters with decreasing band pass width. The set may also or instead include a set of parameters (e.g., minimum/maximum separation frequency, scaling factor, etc.) that allow dynamically generating filters over a continuous range of values.

An initial one of the filters is selected 1801. This initial filter may be the most conservative filter with the smallest band (e.g., almost no signal goes to PZT). Other initial filters may be chosen, e.g., the filter used before last power cycle, least conservative filter, etc. The range of filters selected may have some parameters that at least ensure some level of desired performance. For example, frequencies of the filters may be selected to at least reduce the effects of a parasitic coupling loop between the VCM control signals and the RV sensors.

During device operation (e.g., seeking, tracking) a number of PZT saturations within given time are counted 1802. This count is expressed as a variable X. Other measures of relative saturation may be used, e.g., average, mean, median or other statistical measure of the PZT signal. If it is determined 1803 that X exceeds an upper threshold, then a filter is selected 1804 that decreases $F_{PZT}(s)$, e.g., a filter with a narrower high-frequency band, higher separation frequency, etc. If it is instead determined 1805 that X is less than a lower threshold, then a filter is selected 1806 that increases FPZT(s), e.g., a filter with a wider high-frequency band, lower separation frequency, etc.

Figure 17:
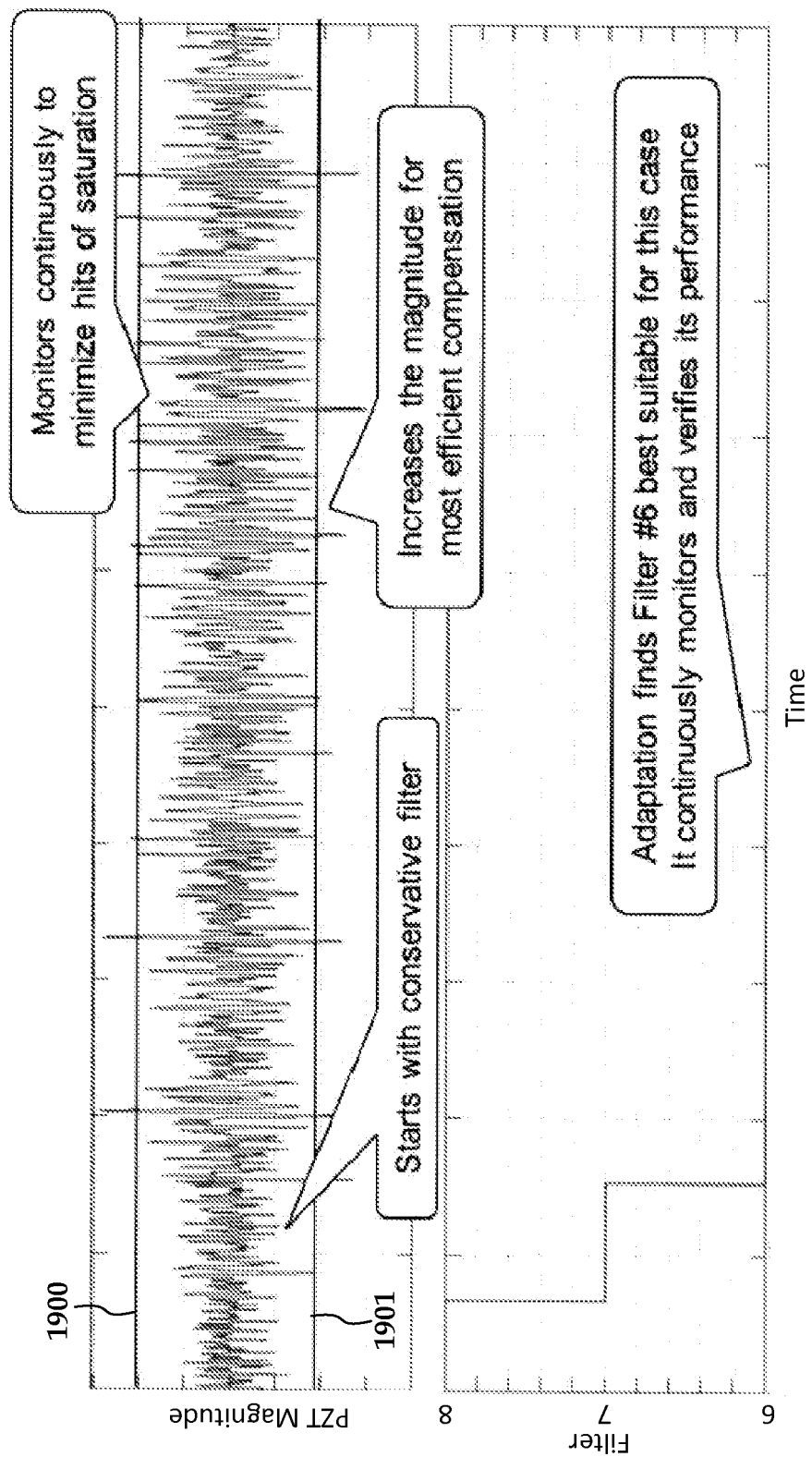
FIG. 17 is a graph illustrating results of a simulated operation of an adaptive dynamic control allocation system according to an example embodiment.

In FIG. 17, a graph illustrates results of a simulated operation of an adaptive DCA filter. It can be seen that the DCA starts with a conservative filter (number 8). The PZT magnitude signal is monitored so that crossing over of threshold values 1900, 1901 is detected. As time progresses, the adaptive DCA shifts towards more aggressive filter (one with a lower number) until the available stroke is more fully utilized, e.g., crossing over at least one of the threshold values 1900, 1901 occurs at a predetermined rate. The adaptive DCA also monitors that the microactuator does not exceed the available stroke, e.g., the PZT magnitude signal does not exceed a second set of thresholds (not shown).

Figure 18:
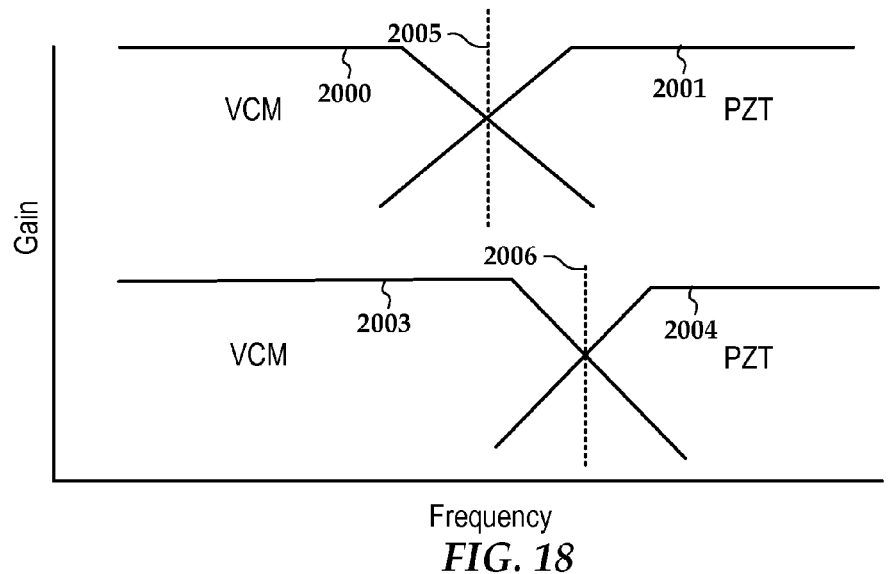
FIG. 18 is a chart illustrating frequency responses of an adaptive dynamic control allocation system according to an example embodiment.

In FIG. 18, a chart illustrates frequency responses of an adaptive DCA according to an example embodiment. Curves 2000, 2001 represent respective frequency responses of low frequency and high frequency components of RV compensation signals sent to the VCM and PZT. The curves 2000, 2001 may at least be defined by a separation frequency 2005, which may correspond to a particular attenuation level of each of curves 2000, 2001.

In response to excessive saturation of the microactuator, a second separation frequency 2006 is selected, which defines response curves 2003, 2004. In this case, the area under curve 2004 is decreased compared to curve 2001, and so microactuator stroke due to RV compensation will be reduced accordingly. If the microactuator stroke range is below a threshold, then the separation frequency can be shifted left (not shown). While separation frequencies are described as defining the VCM and response curves, other parameters may also be used to define and adjust the shape of the curves in response to microactuator saturation (or lack thereof). For example, such as roll-off, phase response, overall attenuation, etc. may also be adjusted via an adaptive DCA. These parameters may be part of a set of predefined filters, or be continuously variable parameters that are used to produce low and high frequency RV compensation components.

Figure 19:
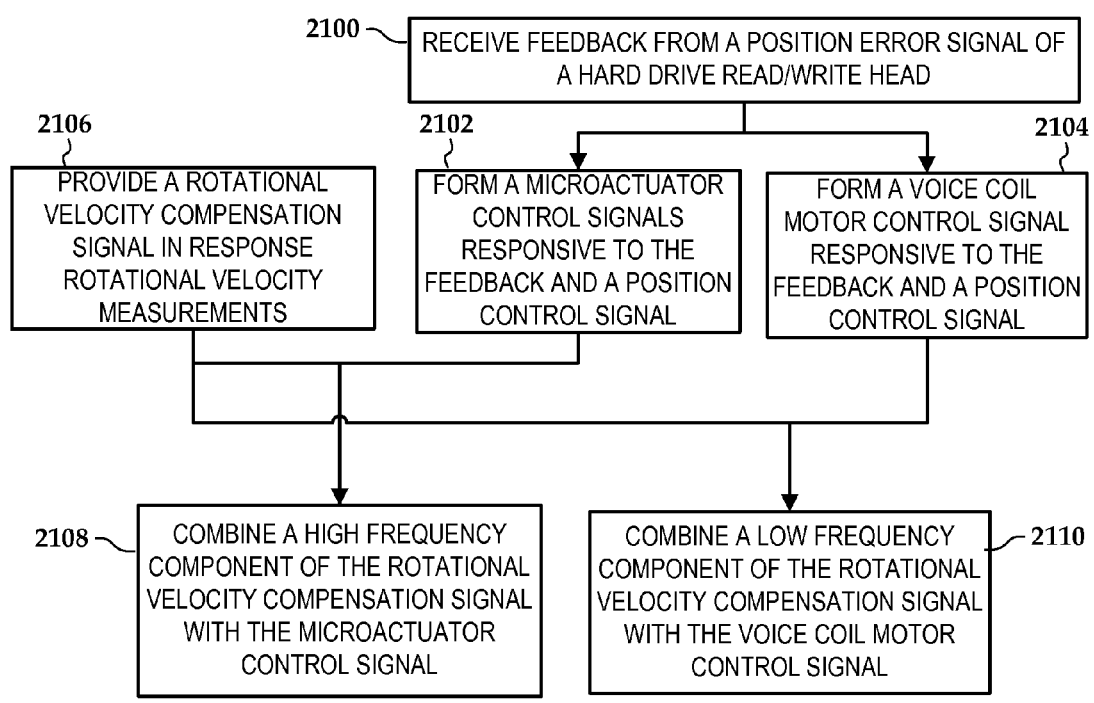
FIG. 19 is a flowchart according to an example embodiment.

In FIG. 19, a flowchart illustrates a method according to an example embodiment. The method involves receiving 2100 feedback from a position error signal of a hard drive read/write head. A microactuator control signal is formed 2102 responsive to the feedback and a position control signal, and a voice coil motor control signal is formed 2104 responsive to the feedback and the position control signal. The position control signal may be used for tracking and/or seeking of a read/write head.

A rotational vibration compensation signal is provided 2106 in response to rotational vibration measurements of a sensor. A high frequency component of the rotational vibration compensation signal is combined 2108 with the microactuator control signal. A low frequency component of the rotational vibration compensation signal is combined 2110 with the voice coil motor control signal. The rotational vibration compensation facilitates increasing the accuracy and stability of the tracking and seeking operations of the read/write head.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   receiving feedback from a position error signal;
   forming respective voice coil motor and microactuator control signals responsive to the feedback and a position control signal;
   receiving rotational vibration measurements via a sensor and provide a compensation signal in response thereto;
   generating a high frequency component and a low frequency component of the compensation signal from an adaptive control algorithm;
   combine a high frequency component of the compensation signal with the microactuator control signal; and
   combine a low frequency component of the compensation signal with the voice coil motor control signal,
   wherein the adaptive control algorithm approximates an ideal compensator response for a virtual actuator that combines a voice coil motor that receives the voice coil motor control signal and a microactuator that receives the microactuator control signal.

2. An apparatus, comprising:
   a feedback controller receiving feedback from a position error signal of a hard drive read/write head, the feedback controller providing respective voice coil motor and microactuator control signals to a voice coil and microactuator that together position the hard drive read/write head in response to a position control signal;
   a rotational vibration feed-forward compensator receiving vibration measurements via a sensor and providing a rotational vibration compensation signal in response thereto; and
   a dynamic control allocator coupled to the feedback controller and the rotational vibration feed-forward compensator, the dynamic control allocator configured to:
      combine a high frequency component of the rotational vibration compensation signal with the microactuator control signal;
      combine a low frequency component of the rotational vibration compensation signal with the voice coil motor control signal;
      determine saturation of the microactuator responsive to at least the high frequency component; and
      if the saturation is below a lower threshold, adjust a separation frequency to increase a bandwidth of the high frequency component, and if the saturation is above an upper threshold, adjust the separation frequency to decrease the bandwidth of the high frequency component,
      wherein the separation frequency corresponds to a separation between the high frequency component and the low frequency component.

3. The apparatus of claim 2, wherein the determining of the saturation of the microactuator and the adjusting of the crossover occurs during operation of the hard drive read/write head.

4. The apparatus of claim 2, wherein adjusting the separation frequency comprises selecting from a predetermined set of frequencies.

5. The apparatus of claim 4, wherein the predetermined set of frequencies are determined by a set of filters.

6. The apparatus of claim 2, wherein the separation frequency is generated by applying a filter from a set of filters.

7. A method comprising:
   forming respective voice coil motor and microactuator control signals responsive to at least a position error signal of a hard drive read/write head;
   providing a rotational vibration compensation signal in response to vibration sensor measurements;
   forming high and low frequency components of the rotational vibration compensation signal based on a separation frequency that is selected to reduce a parasitic coupling loop between the voice coil motor control signal and the vibration sensor measurements;
   combining the high frequency component with the microactuator control signal;
   combining the low frequency component with the voice coil motor control signal; and
   adjusting the separation frequency based on a response of the microactuator to at least the high frequency component.

8. The method of claim 7, wherein the parasitic coupling loop is created by an excitation signal caused by the voice coil motor control signal.

* * * * *